Figure 1:
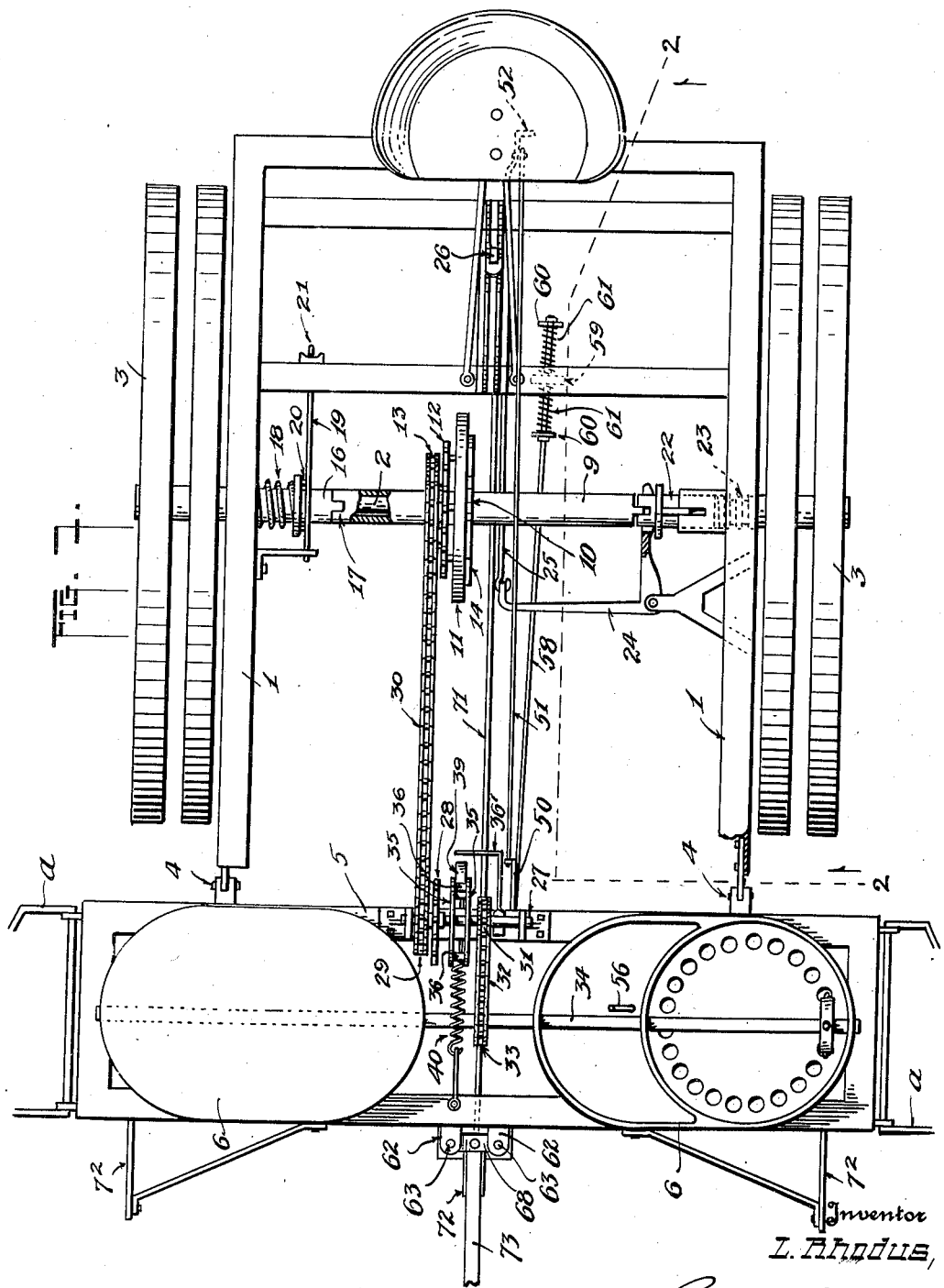

Feb. 23, 1937.  L. RHODUS  2,071,708
CORN PLANTER
Filed Oct. 19, 1934  3 Sheets-Sheet 1

Inventor
L. Rhodus,
By L. M. Kurlow
Attorney

Feb. 23, 1937.  L. RHODUS  2,071,708
CORN PLANTER
Filed Oct. 19, 1934  3 Sheets-Sheet 2

Fig. 2.

Fig. 2a.

Inventor
L. Rhodus,
By *L. M. Thurlow*
Attorney

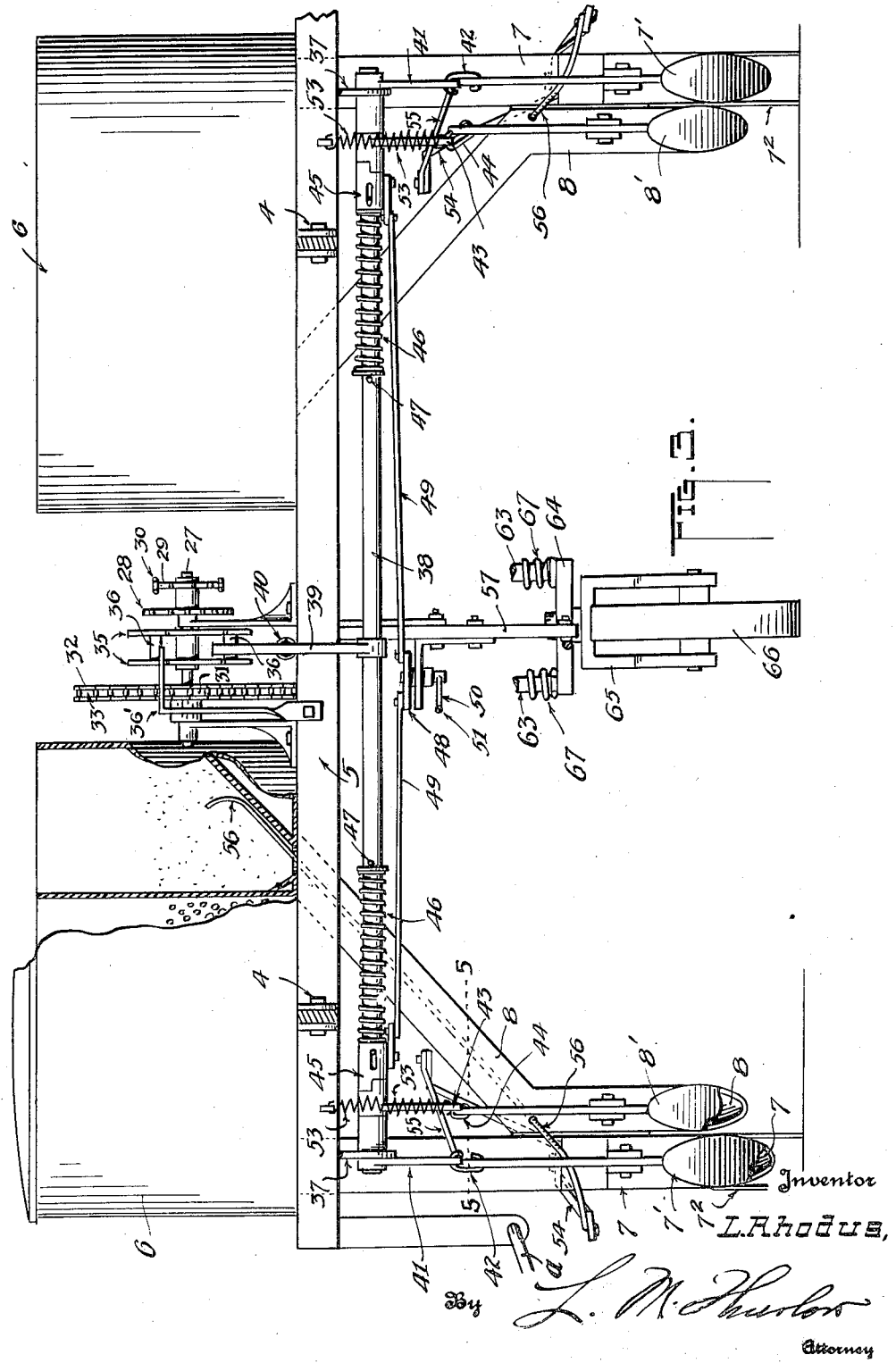

Patented Feb. 23, 1937

2,071,708

UNITED STATES PATENT OFFICE 2,071,708

CORN PLANTER

Lloyd Rhodus, Kelso, Wash., assignor to Herbert H. Vertrees, Pittsfield, Ill.

Application October 19, 1934, Serial No. 749,049

5 Claims. (Cl. 111—16)

This invention relates to improvements in corn planters, being directed more particularly to planters whose seeding mechanism is operated from the carrying wheels rather than by the customary check-row wire.

An object is to construct a planter that is self leveling by resting upon a caster-wheel at its forward portion to the end that as nearly as possible a uniform depth of planting can be maintained.

Another object of the invention is to provide means by which a floating action of the planter frame is made possible whereby the seed spouts are prevented having swinging action in the direction of travel and thereby maintain a straighter row of planted hills.

Another object is to provide a caster-wheel at the forward side of the planter for elastically supporting the furrow openers and seeding mechanism and to provide a pivoted guiding tongue all to the end that the planted hills will be uniformly placed as to depth, and that the hills will be placed in properly aligned rows.

Again, an object lies in planting seed through mechanism operated from the carrying wheels of the planter together with manually adjustable means by which the hills to be planted may be aligned accurately with the planted row to the end that straight plant rows may be readily and properly maintained.

Still another object is to operate seeding mechanism from the carrying wheels of a planter and furnish gearing connected between the mechanism and said wheels that can be changed whereby to vary the distance between planted rows.

In addition to the above objects the invention relates to certain details of construction and arrangement of parts to be pointed out herein and to form the subject of certain of the claims to follow. In the appended drawings, Figure 1 is a plan of my improved planter. Figure 2 is a side elevation of the planter taken on line 2—2 of Figure 1. Figure 2a is a plan of parts of a fertilizer agitator-mechanism, parts being shown in horizontal section. Figure 3 is a rear elevation of that part of the planter only that carries the seeding mechanism, the same being produced on a much larger scale than the preceding figures, and taken on lines 3—3 of Figure 1.

The main frame 1 of the planter is supported through an axle 2 for the wheels 3, said frame having pivotal connection in any usual way at 4 with a secondary frame, i. e., the seeder frame or runner frame 5 carrying combined seed and fertilizer boxes 6. The said frame 5 is supported upon the usual runners or furrow openers with which are included seeding tubes 7 and fertilizer conducting tubes 8, each leading to separate compartments of said boxes, any usual or well known marker-arms $a$, not shown in full, being pivoted at each end of said frame 5 together with suitable control means, not shown.

A sleeve 9 encloses the middle portion of the axle 2 and is free to rotate thereon. To said sleeve is affixed a ratchet wheel 10 and rotatably mounted on the sleeve adjacent said wheel 10 is a plate 11 and affixed to the latter may be one or more sprocket wheels 12, 13 each having a different number of teeth. Pivoted upon the plate 11 is a plurality of pawls 14 urged toward the teeth of the ratchet wheel by suitable springs 15. Affixed in suitable manner to an adjacent wheel 3 at one end of the sleeve 9 is a clutch sleeve 16, said sleeve being slidable along the axle and adapted to engage said sleeve 9 as at 17, a spring 18 serving to maintain such engagement, while a rock-shaft 19 having any usual shifting-fork 20 serves to shift the clutch-sleeve in opposition to the said spring 18 through a lever 21. At the other end of the sleeve 9 is a clutch-sleeve 22 likewise adapted to engage such sleeve, the same rotating with the adjacent wheel 3 and normally urged into clutching engagement by a spring 23, and thus through either of the clutch-sleeves the sleeve 9 may be rotated to impart rotation to the said ratchet wheel 10 and the plate 11. A forked lever 24 serves to disengage the clutch-sleeve 22 from the sleeve 9, said lever being connected by a link 25 to an operating lever 26 pivotally supported at the planter-frame in reach of the operator.

Journaled on the runner frame 5 is a shaft 27 affixed to which is a pair of sprocket wheels 28, 29 each of which is in line with one of the sprocket wheels 12, 13 previously described, a sprocket-chain 30 connecting any two of them as shown. Affixed to the said shaft 27, also, is a sprocket wheel 31, which through a chain 32 and sprocket wheel 33 drives a shaft 34 which extends through the seed boxes 6 as best shown in Figure 1. Fixed upon and rotatable with said shaft 27 is a tripping member comprising in the present instance a pair of spaced plates 35 between which extend a series of three portions or pins 36, in this instance. Journaled in hangers 37, for example, beneath the runner frame 5, see Figure 3, is a shaft 38 affixed to which is a lever 39 whose free end lies in position to receive contact of the named pins 36 in their rotation with the plates 35, a spring 40 connected between the said lever and frame 5 serving to maintain said lever in the path of said pins. By this or an equivalent arrangement it will be seen that a rocking movement will be imparted to the shaft for a purpose now to appear. Pivoted to each of the seed tubes 7 is a valve 7' and to each of the fertilizer tubes 8 a valve 8' is pivoted. Affixed to each end of the rock-shaft 38 is a depending arm 41 whose free end is connected by a link 42 to the arm of the valve 7'. Depending also from the rock-shaft is an arm 43 above each of the valves 8', each being connected to the arm of the latter by a link 44. The arms 43 are loose on the shaft 38 and adjacent the hub of each is a sleeve 45 slidable along the shaft but adapted to rock therewith, the sleeve and hub having engageable clutch-portions, the sleeves being held in clutching engagement by springs 46, for example, compressed between such sleeves, and pins 47 in said shaft. Pivotally mounted between its ends on a fixed part of the planter is a lever 48 and to each of its ends is connected one end of a pull-rod 49 whose other ends are suitably pivotally connected to the named sleeves 45. A lever 50 in control of the lever 48 is connected by a rod 51 to a foot-lever 52, for example, near the operator's foot and by this means the clutch-sleeves 45 can be held withdrawn from the hubs of the levers 43, the latter being held raised to hold the valves 8' closed by springs 53, Figures 2 and 3, connected between said levers 43 and the frame 5. Since the levers are lifted at their free ends they hold the said valves 8' closed through the connection of the described links 44 between the latter and said levers.

As has been intimated, the containing spaces of the boxes 6 are divided into two compartments, one holding seed and the other a fertilizer, it being observed in Figure 3 that the tube 7 may receive the seed while the tube 8 extends to and opens into the fertilizer compartment, and may receive fertilizer therefrom. In order that the fertilizer material may be kept in agitation and properly fed into the tube 8 mechanism is provided for that purpose. In said Figure 3 and also in Figure 2a is shown a bell-crank lever 54 pivoted in this instance on each of the runners or furrow openers 7², one arm thereof being connected by a link 55 with the arm of the valve 7', the other arm having a more or less flexible wire 56, for example, connected with it and extending through the wall of the fertilizer tube 8 and up through the latter into the fertilizer compartment, the whole being arranged in such manner that in the oscillation of the valve 7' the agitating wire will be given a longitudinal shifting movement.

Rigidly attached to the runner frame 5 is a depending arm 57 and connected therewith is one end of a reach 58 of rigid type which at its other end extends through a depending bracket 59 on the planter frame 1. The rod carries at each side of the bracket a fixed stop 60, and between each stop and said bracket is a compression spring 61, such an arrangement serving to provide a certain steadying of the runner frame with respect to said planter-frame during operations in the field.

Connected rigidly with respect to the frame 5 is a clevis 72 within which a tongue 73 is pivoted at 74, for example, and said tongue may be free to move vertically with respect to the clevis, or it may be secured with respect to the latter in any usual manner.

Operation

In the advance of the machine with the wheels clutched to the sleeve 9 the ratchet wheel 10 will rotate the plate 11 contrary clockwise, as viewed in Figure 2, through the pawls 14 thereby driving the seeding and fertilizing mechanism through the sprocket wheel 13, chain 30, and sprocket wheel 29 of said seeding mechanism. In the rotation of any usual seed plate arrangement within the seed compartments of the boxes 6 the seed is liberated into the tubes 7 upon the valves 7' where it is held until discharged by the opening movement thereof. The rate of rotation of the pins 36 of the plates 35 about the shaft 27 is such, having regard to their spacing and the relative size of the sprocket wheels, that the lever 39 engaged by the said pins will be operated each time the seed tubes 7 have traveled a distance equal to the spacing of any two rows. In order that the valves may be opened at a row, however, at the start of a planting operation the marker-rod a is aligned with a row while the planter is stationary whereupon the plate 11 at the sleeve 9 is advanced by hand until one of the pins 36 has met and is ready to swing the lever 39 to open the valve 7'. Now as the planter is started forward the valves will be opened to deposit the seed at this position followed by properly spaced succeeding plantings. Should the timing of the opening movement of the valves tend to vary the operator by comparing the position of the marker-rod at a row with the time of probable opening of said valves and, finding that such opening movement will likely be at variance with such position of said marker-rod, he may grasp and turn the plate 11 with respect to the pawls 14 to such a position that the time of planting will be correct. It is to be understood at this time that the number of ratchet teeth on the wheel 10 and their spacing is such that at least one of the pawls will always engage a tooth at any setting of the said plate 11 and thus there will be no lost motion after any such setting.

At each action of a valve 7 the wire 56 will be actuated through the link 55 and lever 54 to agitate and to cause the feeding of the fertilizer upon a valve 8' for deposit. Whether or not the fertilizer is to be deposited at each hill depends upon the relation of the clutch-sleeves 45 to the hubs of the arms 43. By actuating the lever 52 at the driver's seat the deposit of fertilizer may be prevented by disengaging the clutch portions.

If it is desired to change the spacing of the rows being planted the chain 30 may be shifted to the other pair of sprocket wheels 12, 28 for a different rate of rotation of the seeding mechanism. At each action of the valves 7' the spring 40 returns them to their seats with a strong snap action and in this way they will be delivered of any soil that may chance to adhere to them such as might interfere with the proper liberation of the seed.

In order that the seed may be planted at as nearly a uniform depth as possible I provide the caster-wheel 66. The runner frame 5 may thus be supported and more or less elastically controlled through the springs 67. Or, if the operator desires to work at a given depth he may set the lever 26 at a desired position and such setting will result in either raising or lowering the frame through the bell-crank lever 70 and rod 71.

It is well known that when the tongue of a planter is hung from the necks of the horses the seed tubes partake of a swinging motion in line with the direction of travel due to the vertical movements imparted. This movement of the tubes causes a misalignment of the planted hills so that during cultivating operations the hills thus out of line are often destroyed. Because of this I provide for a steadying action of the frame 5. This is accomplished by the use of the caster-wheel, the tongue being left free to rise and fall with the movements of the horses and acting only as a guide for the planter. Since the tongue does not carry the frame the seed will be dropped from the tubes maintained in a substantially fixed vertical position.

In transporting the planter to and from the field, or in turning in the field, it is only necessary to move the operating lever 26 far enough forward to raise the runners from the ground where they are supported on the caster-wheel, this action also terminating clutching engagement of one of the wheels 3 with the sleeve 9, driving action of the other wheel being likewise terminated by manipulation of the lever 21.

When desiring a floating action of the entire planter mechanism the lifting of the latch 26' of the lever 26 will provide for it, the link 26² securing said latch. The said mechanism is thus free to rise and fall with respect to the caster-wheel, the runners finding any depth of cut the weight of the planter may bring about depending, however, upon the resistance set up by the springs 67.

I claim:

1. A planter including in its construction, and in combination with a secondary frame carrying seeding mechanism, a seed delivery tube container for a fertilizer, a fertilizer tube leading from each container, and a valve for each tube, a shaft, means for rocking the shaft, lever arms affixed to the shaft, linkage connecting the lever arms and the valves of the tubes, an agitator extending up through the fertilizer tube into the container for the fertilizer, and mechanism operatively connecting the agitator with the shaft for imparting movement to the said agitator from said shaft in the direction of and through the fertilizer of the container.

2. A corn planter including in its construction a runner frame, a pair of commodity compartments thereon, a delivery tube opening into each compartment, a valve pivoted at each tube for closing its delivery outlet, a shaft journaled on the frame, a lever fixed to the shaft and operatively connected to one of the valves, a clutch member mounted on the shaft free thereof, a second clutch member slidable on the shaft adapted to engage the first said clutch member, a lever fixed with respect to the second clutch member and operatively connected with the other of the valves, means constantly tending to hold the clutch members in engagement, and manually operated means for disengaging the said clutch members.

3. A planter including in its construction, and in combination with a secondary frame carrying seeding mechanism including seed delivery tubes, containers for a fertilizer, a fertilizer distributing tube leading from each, and a valve for each tube, a shaft journaled on the frame, a lever-arm affixed thereto, a linkage connecting a lever-arm with the valve of a seed delivery tube, an agitator extending up through a fertilizer delivery tube and into the container for the fertilizer, mechanism connecting the agitator with the valve, and means for rocking the said shaft.

4. In a planter, in combination with a frame, seeding mechanism mounted thereon including a seed container and fertilizer container, a delivery tube leading from each container for deposit of the commodity in each, and a valve for each tube, of a shaft journaled on the frame, a lever-arm affixed to and depending from the shaft and linked to the valve of the seed tube, means for rocking the shaft, a second lever-arm mounted on the shaft free to turn with respect thereto, a clutch member rockable with the shaft adapted to be engaged with the last named lever-arm, means to withdraw the clutch member from the latter, linkage connecting the last named lever-arm with the valve of the fertilizer tube, a pivotally mounted lever, an agitator attached to the lever and extending up through the fertilizer tube into the fertilizer container, and a linkage connecting one lever with the said valve of the seed tube.

5. The combination with a planter frame and its runners, a fertilizer container mounted thereon, a valved tube leading from such container to near the said runners, and driving mechanism for operating the valve, of an agitator portion extending into and through part of the bore of said tube and into the said fertilizer container, said mechanism operatively engaging said portion and adapted to shift the same in each action imparted to the said valve.

LLOYD RHODUS.